(12) United States Patent
Konno et al.

(10) Patent No.: US 9,022,162 B2
(45) Date of Patent: May 5, 2015

(54) VEHICLE ANTI-THEFT DEVICE

(75) Inventors: Takeshi Konno, Wako (JP); Naoyuki Yamate, Wako (JP); Yoshiaki Hirakata, Wako (JP); Hitoshi Tsusaka, Wako (JP); Takeshi Sugimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/127,543

(22) PCT Filed: Jun. 23, 2011

(86) PCT No.: PCT/JP2011/064389
§ 371 (c)(1),
(2), (4) Date: Jan. 20, 2014

(87) PCT Pub. No.: WO2012/176299
PCT Pub. Date: Dec. 27, 2012

(65) Prior Publication Data
US 2014/0144720 A1   May 29, 2014

(51) Int. Cl.
| | | |
|---|---|---|
| B60R 25/10 | (2013.01) | |
| B62H 5/00 | (2006.01) | |
| B60R 25/40 | (2013.01) | |
| B62M 7/02 | (2006.01) | |
| B60R 16/02 | (2006.01) | |
| B60R 25/00 | (2013.01) | |
| B62H 5/20 | (2006.01) | |

(52) U.S. Cl.
CPC  *B62H 5/00* (2013.01); *B60R 25/40* (2013.01); *B62M 7/02* (2013.01); *B60R 16/02* (2013.01); *B60R 25/00* (2013.01); *B62H 5/20* (2013.01)

(58) Field of Classification Search
CPC .......... B62H 5/00; B60R 16/02; B60R 25/00; B60R 25/01; B60R 25/10; B60R 25/40
USPC ........... 180/219, 287; 340/472; 307/9.1, 10.2, 307/10.7
See application file for complete search history.

(56) References Cited

U.S. PATENT DOCUMENTS

| | | | | |
|---|---|---|---|---|
| 4,322,714 | A * | 3/1982 | Morgan ........................ | 340/427 |
| 6,243,005 | B1 * | 6/2001 | Haimovich et al. ........... | 340/427 |
| 7,836,989 | B2 * | 11/2010 | Reed et al. .................... | 180/68.5 |
| 8,739,908 | B2 * | 6/2014 | Taniguchi et al. ........... | 180/68.5 |
| 8,878,483 | B2 * | 11/2014 | Darroman et al. ............ | 320/107 |
| 2005/0103069 | A1 * | 5/2005 | Konno et al. ................... | 70/282 |

(Continued)

FOREIGN PATENT DOCUMENTS

| | | |
|---|---|---|
| JP | 3901566 B2 | 1/2007 |
| JP | 2009-105346 A | 5/2009 |

(Continued)

*Primary Examiner* — James English
(74) *Attorney, Agent, or Firm* — Carrier Blackman & Associates, P.C.; Joseph P. Carrier; William D. Blackman

(57) ABSTRACT

A vehicle anti-theft device (60) contains: a case body (132); a lid member (156) for closing the opening (167) of the case body; a substrate (67) which is inserted in a removable manner into the case body (132) from the opening thereof and on which electronic components are mounted; a sub-battery (88) for supplying power to the substrate (67); and a sealing member (157) which is fitted into the opening (167) of the case body and has a substrate pressing part (203) for preventing the substrate from being extracted and a sub-battery pressing part (204) for preventing the sub-battery (88) from being extracted.

12 Claims, 15 Drawing Sheets

(56) References Cited

U.S. PATENT DOCUMENTS

| | | | |
|---|---|---|---|
| 2006/0033635 A1* | 2/2006 | Chen | 340/693.6 |
| 2006/0186990 A1* | 8/2006 | Yamamoto et al. | 340/5.61 |
| 2008/0156050 A1* | 7/2008 | Konno et al. | 70/233 |
| 2012/0048630 A1* | 3/2012 | Nishiura et al. | 180/65.31 |
| 2013/0082659 A1* | 4/2013 | Kano | 320/128 |
| 2013/0105240 A1* | 5/2013 | Tsai et al. | 180/219 |
| 2013/0285410 A1* | 10/2013 | Auerbach et al. | 296/178 |
| 2014/0125472 A1* | 5/2014 | Konno et al. | 340/427 |

FOREIGN PATENT DOCUMENTS

| | | |
|---|---|---|
| JP | 2010-248707 A | 11/2010 |
| JP | 2011-036085 A | 2/2011 |

\* cited by examiner

VEHICLE ANTI-THEFT DEVICE

TECHNICAL FIELD

The present invention relates to a device for preventing theft of a vehicle.

BACKGROUND ART

An anti-vehicle-theft device carried on a vehicle for preventing theft of the vehicle is disclosed in patent literature 1 below.

The anti-vehicle-theft device disclosed in patent literature 1 includes a sensor for detecting a vehicular abnormality and transmitting an abnormal signal indicative of the detected abnormality to a control section. The abnormal signal transmitted to the control section is transmitted through a mobile phone communication section to a base station. The base station then informs a monitoring center via a mobile phone network. The anti-vehicle-theft device is powered by a sub-battery when a main battery for feeding an electric power to the device runs out.

As discussed above, the anti-vehicle-theft device includes the sensor, the control section, the mobile phone communication section, and the sub-battery. The sensor, the control section, the mobile phone communication section and the sub-battery are accommodated within an airtight case.

The sub-battery is replaced with a new one when a life of the sub-battery ends. To replace the sub-battery, the case has a lid detachable to allow the sub-battery to be removed from the case and the new sub-battery to be attached to the case. Between the case and the lid, a seal structure should be provided to prevent entry of moisture etc. into the case during the attachment or removal of the sub-battery.

It is necessary to limit movement of the sub-battery within the case. For instance, where the sub-battery is fixed by screws etc, unscrewing operation is required, which makes the replacement of the sub-battery troublesome. Where the sub-battery is fixed using fasteners other than the screws, such fasteners need to be prepared. Because of these fasteners, the anti-vehicle-theft device increases in number of the components, size and weight. Thus, the anti-vehicle-theft device having the built-in sub-battery needs to make the case watertight and fix the sub-battery in the case in a manner to facilitate replacement of the sub-battery without requiring increase in the number of the components.

PRIOR ART LITERATURE

Patent Literature

Patent Literature 1: JP-B-3901566

SUMMARY OF INVENTION

Technical Problem

It is an object of the present invention is to provide an anti-theft device configured to ensure not only a sealability but also that a sub-battery is fixed in a case in a manner to facilitate replacement of the sub-battery without requiring increase in number of components, so as to improve workability.

Solution to Problem

According to one aspect of the present invention, there is provided an anti-vehicle-theft device carried on a vehicle for preventing theft of the vehicle, the device comprising: a box-shaped case body having one open side; a lid member detachably attached to the case body and closing an opening of the case body, the lid member having a circumferential wall projecting into the case body a circuit board removably inserted through the opening of the case body into the case body and having electronic components mounted thereon; a sub-battery removably inserted through the opening of the case body into the case body for feeding an electric power to the circuit board when a main battery carried on the vehicle for feeding an electric power to the circuit board runs out; a seal member fitting in the opening of the case body, the seal member having a groove into which the circumferential wall of the lid member is inserted, the seal member including a circuit board stopper portion for preventing the circuit board from coming out of the case body, and a sub-battery stopper portion for preventing the sub-battery from coming out of the case body.

Preferably, the circuit board includes left and right cutouts at left and right ends thereof, respectively, and the seal member includes left and right recesses holding the left and right cutouts of the circuit board stationary.

Desirably, one of the case body and the lid member includes a fitting projection, and a remaining one includes a fitting recess in which the fitting projection fits.

Preferably, the sub-battery has an elastic cover, the sub-battery being wrapped in the elastic cover, the case body has a side from which the sub-battery is inserted into the case body, the elastic cover having a free portion formed on the same side as the side of the case body for allowing the sub-battery to be inserted into and removed from the elastic cover, the elastic cover having a finger engaging portion for engagement with an operator's finger when the operator pulls the sub-battery out of the elastic cover.

Preferably, the case body is supported by the vehicle through an elastic member, the case body has an upper surface indicating an ID number of the anti-theft device, and the elastic member has a cutout portion formed to allow the ID number to be viewable when the case body is wrapped in the elastic member.

Preferably, the case body has a hole closed by a waterproof breathable membrane.

Preferably, the circuit board has a width extending in a direction perpendicular to a direction in which the circuit board is inserted into and removed from the case body, and the width gradually increasing toward the left and right cutouts of the circuit board.

Preferably, the circuit board is disposed above the sub-battery.

Preferably, the circuit board has a coupler mounted thereon for separating the sub-battery from the circuit board.

Preferably, the case body has an upper surface including an indicating area indicating an ID number, the case body having an operation indicating member provided on the upper surface thereof for indicating operation of the circuit board to outside the case body.

Preferably, the case body has a bottom wall including a partition wall around the hole, the partition wall surrounding the waterproof breathable membrane.

Preferably, the vehicle includes a seat for an occupant and a grab rail extending laterally leftward and rightward from the seat, and the anti-theft device is offset laterally inwardly from each of lateral outer ends of the grab rail.

Advantageous Effects of Invention

As defined in claim 1, the circuit board having the electronic components mounted thereon is removably inserted through the opening of the case body into the case body.

The bus-battery can be attached to and removed from the case body just by insertion of the sub-battery into the case body through the opening and draw of the sub-battery from the case body through the opening. The circuit board can be attached to and removed from the case body by insertion of the circuit board into the case body through the opening and draw of the circuit board from the case body through the opening. Since the sub-battery and the circuit board can be easily attached to and removed from the case body, thus, the sub-battery can be easily replaced.

The seal member fits in the opening of the case body. The lid member closes the opening of the case body with the circumferential wall of the lid member extending into the case body and inserted into the groove of the seal member. The seal member is interposed between the case body and the lid member and the circumferential wall of the lid member pressed into the groove of the seal member, which ensures an enhanced sealability.

The seal member includes the circuit board stopper portion for preventing the circuit board from coming out of the case body and the sub-battery stopper portion for preventing the sub-battery from coming out of the case body.

The circuit board stopper portion holds the circuit board inserted into the case body and the sub-battery stopper portion holds the sub-battery inserted into the case body. This is advantageous because the circuit board and the sub-battery can be reliably fixed in the case body without requiring increase in the number of the components.

As is clear from the foregoing, thus, the anti-vehicle-theft device of the present invention is configured to ensure the enhanced sealability and fix the sub-battery in the case in a manner to facilitate replacement of the sub-battery without requiring increase in the number of components.

As defined in claim 2, the circuit board held in contact with the seal member has the left and right cutouts at the left and right ends thereof, and the seal member includes the left and right recesses holding the left and right cutouts stationary.

The circuit board is held stationary by the circuit board stopper portion and the left and right recesses, such that the circuit board can be reliably fixed in the case body.

As defined in claim 3, the case body has the fitting projection, and the lid member has the fitting recess in which the fitting projection fits.

The fitting projection and the fitting recess fittingly receiving the fitting projection are formed on the case body and the lid member, respectively, such that the fitting projecting fits in the fitting recess to orient the lid member in a predetermined correct direction for attachment of the lid member to the case body.

As defined in claim 4, the sub-battery is wrapped in the elastic cover, and the elastic cover has the finger engaging portion. It is possible for an operator to easily remove the sub-battery from the sub-battery support portion of the case body by pulling the sub-battery out of the sub-battery support portion with his finger engaged with the finger engaging portion of the elastic cover covering the sub-battery after the seal member is detached from the case body. As a result, the workability regarding the insertion or removal of the sub-battery can be improved.

As defined in claim 5, the case body is elastically supported and wrapped in the elastic member. The seal indicating the ID number is stuck to the top wall. The cutout portion is formed on the elastic member to allow the ID number on the seal to be viewable with the elastic member attached to the case body.

The elastic member wraps the case body to protect the case body such that the case body 132 can be subjected to little vibration and be more reliably secured to the vehicle body frame, as compared to the case body merely supported on an elastic member. Since the elastic member has the cutout portion formed thereon to allow the ID number to be viewable, it is not necessary to remove the elastic cover in viewing the ID number even when the anti-theft device is wrapped in the elastic member.

As defined in claim 6, the hole of the case body is closed by the waterproof breathable membrane. The waterproof breathable membrane is a sheet-shaped one which allows mists of water to pass therethrough but does not allow drops of water to pass therethrough. The case body has an inside space communicating with the outside through the waterproof breathable membrane, thereby facilitating release of damp residues in the inside space into the outside.

As defined in claim 7, the width of the circuit board gradually increases toward the left and right cutouts formed on the circuit board. As the circuit board slides along the left and right circuit board supports during insertion of the circuit board into the case body, left and right end surfaces of the circuit board come close to the left and right circuit hoard supports. When the insertion of the circuit board into the case body is completed, the left and right end surfaces at the increased width of the circuit board abut on the left and right circuit board supports.

The circuit board can be easily received in the circuit board supports without requiring a large force because a gap is formed between each of the left and right end surfaces of the circuit board and each of the left and right circuit board supports as the circuit board is inserted into the case body. When the insertion of the circuit board into the case body is completed, the left and right end surfaces of the circuit board abut on the left and right circuit board supports to ensure that the circuit board can be supported in place.

As defined in claim 8, the circuit board is disposed above the sub-battery. Since the heavy sub-battery is disposed low and the circuit board smaller in weight than the sub-battery is disposed above the sub-battery, a center of gravity of the anti-theft device can be located low.

As defined in claim 9, the coupler is disposed on the circuit board for separation of the sub-battery from the circuit board. By virtue of the coupler, the sub-battery can be separated from the circuit, board. To replace the sub-battery, the sub-battery is separated from the coupler with the lid member removed and is pulled out of the case body. That is, the sub-battery can be replaced just by pulling only the sub-battery out of the case body without pulling the circuit hoard out of the case body.

As defined in claim 10, the operation indicating member indicating operation of the circuit board to outside the case body 132 and the indicating area where the seal indicating the ID number is stuck are provided on the upper surface of the case body.

Since the operation indicating member can be viewed just by removal of the seat, operation of the anti-theft device can be easily confirmed.

As defined in claim 11, the bottom wall of the case body includes the partition wall around the hole.

Moisture on the bottom wall of the case body tends to be forced into the hole due to a pressure difference caused when a pressure in the inside space of the case body becomes lower than the atmospheric pressure.

In this regard, the present invention provides the partition wall disposed around the hole 193, such that moisture on the bottom wall of the case body is directed downwardly by the partition wall without entering the inside space of the case body through the hole.

As defined in claim 12, the anti-theft device is offset laterally inwardly from each of the lateral opposite outer ends of the grab rail, such that the anti-theft device is protected by the grab rail. The grab rail projects laterally outwardly from the seat extending over the anti-theft device, thereby making the anti-theft device difficult for a third party's hand to access.

DESCRIPTION OF EMBODIMENT

A certain preferred embodiment of the present invention is described below with reference to the accompanying drawings.

Embodiment

Figure 1:
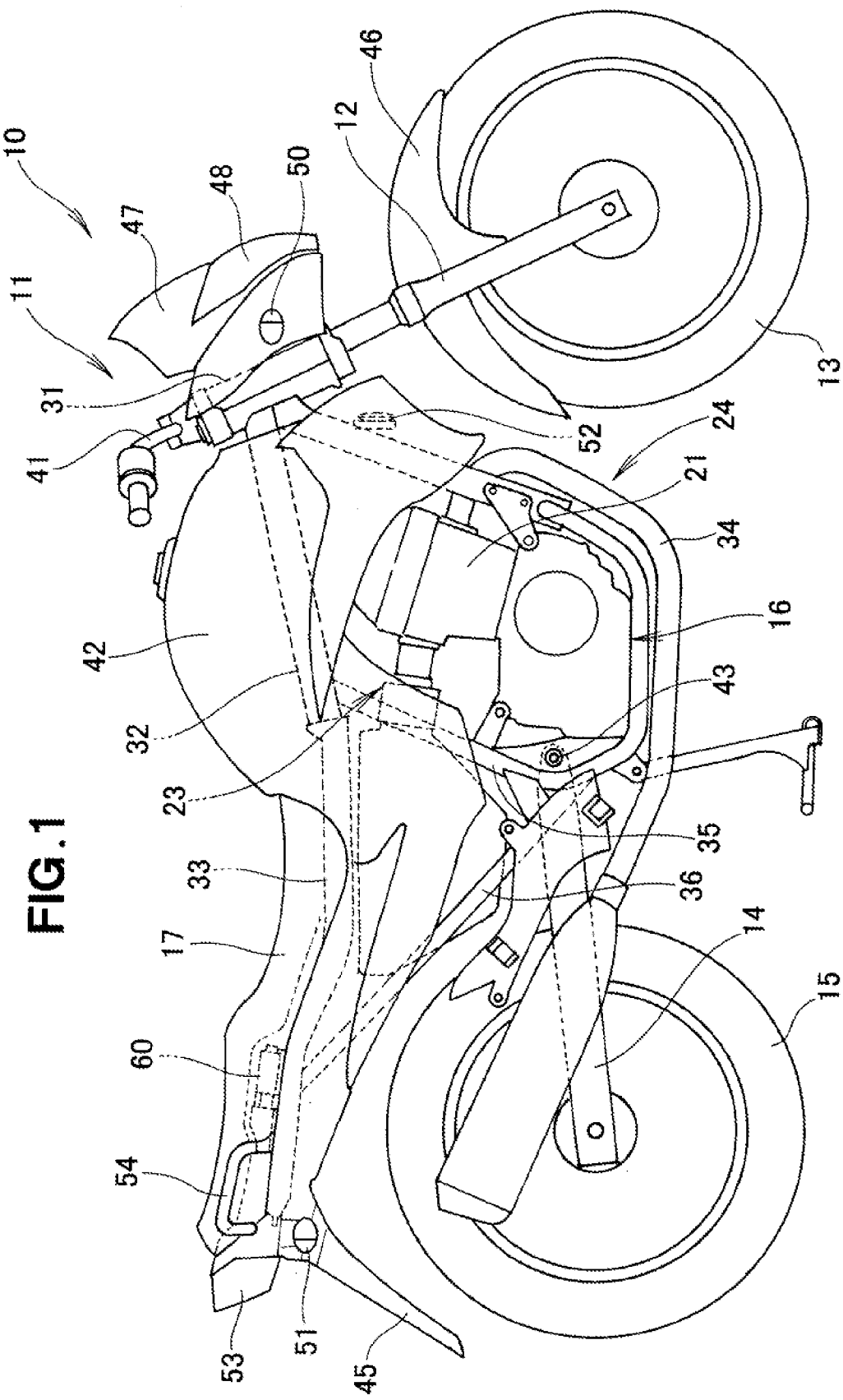
FIG. 1 is a right side view of a motorcycle employing an anti-theft device according to the present invention.

As shown in FIG. 1, a motor cycle or two-wheeled motor vehicle 10 includes a vehicle body frame 11 having a front fork 12 disposed at a front portion of the frame 11. The front fork 12 has a front wheel 13 at a lower end thereof. A swing arm 14 extends rearwardly from the vehicle body frame 11 and has a rear wheel 15 at a rear end thereof.

Between the front wheel 13 and the rear wheel 15, an engine 16 is disposed. The engine 16 is suspended from the vehicle body frame 11. The engine 16 includes a cylinder unit 21 connected to an intake system 23 for feeding an air-and-fuel mixture to the cylinder unit 21. The cylinder unit 21 of the engine 16 is connected to an exhaust system 24 for discharging an exhaust gas. Mounted on the vehicle body frame 11 between the front wheel 13 and the rear wheel 15 is a seat 17 of which a rider is seated astride.

Discussion will be made below as to the vehicle body frame and its associated parts.

The vehicle body frame 11 includes a head pipe 31, a main frame 32 extending rearwardly from the head pipe 31, and a seat rail 33 extending rearwardly from the main frame 32. The vehicle body frame 11 also includes a lower frame 34 extending downwardly and rearwardly from the head pipe 31 and then rearwardly of the motorcycle 10. The lower frame 34 has a rear end connected to a central frame 35 extending from the main frame 32. The vehicle body frame 11 further includes a rear frame 36 extending rearwardly and upwardly from the central frame 35 and connected to a rear part of the seat rail 33.

The front fork 12 is steerably supported by the hear pipe 31. The front fork 12 has an upper end to which is attached a handlebar 41. The front fork 12 has a lower end to which is attached the front wheel 13. A fuel tank 42 is disposed between the handlebar 41 and the seat 17 above the engine 16. The fuel tank 42 is supported by the main frame 32.

The central frame 35 has a lower portion through which a pivot shaft 43 extends laterally of the motorcycle 10. The swing arm 14 extends rearwardly from the pivot shaft 43. The swing arm 14 has a rear end to which is attached the rear wheel 15.

Next, discussion will be made below as to parts such as covers, lights and indicators.

The front fork 12 has a lower portion to which is attached a front fender 46 adapted to block mud thrown up by the front wheel 13. The front fork 12 has an upper portion on which is disposed a front cowl 47. The front cowl 47 has a front face 47a having a headlight 48 mounted thereon. Front blinkers 50 are mounted on lateral side portions of the front cowl 47.

A horn 52 is attached to the lower frame 34. A rear fender 45 is attached to the seat rail 33 for blocking mud thrown up by the rear wheel 15. A rearward facing stop lamp 53 is attached to the rear fender 45. Rear blinkers 51 are attached to lateral sides of the rear fender 45.

Disposed on the rear part of the seat rail 33 is an anti-theft device 60 adapted to detect abnormality and indicate the same to the surroundings when the motorcycle 10 is stolen.

Next, discussion will be made below as to arrangement of the anti-theft device.

Figure 2:
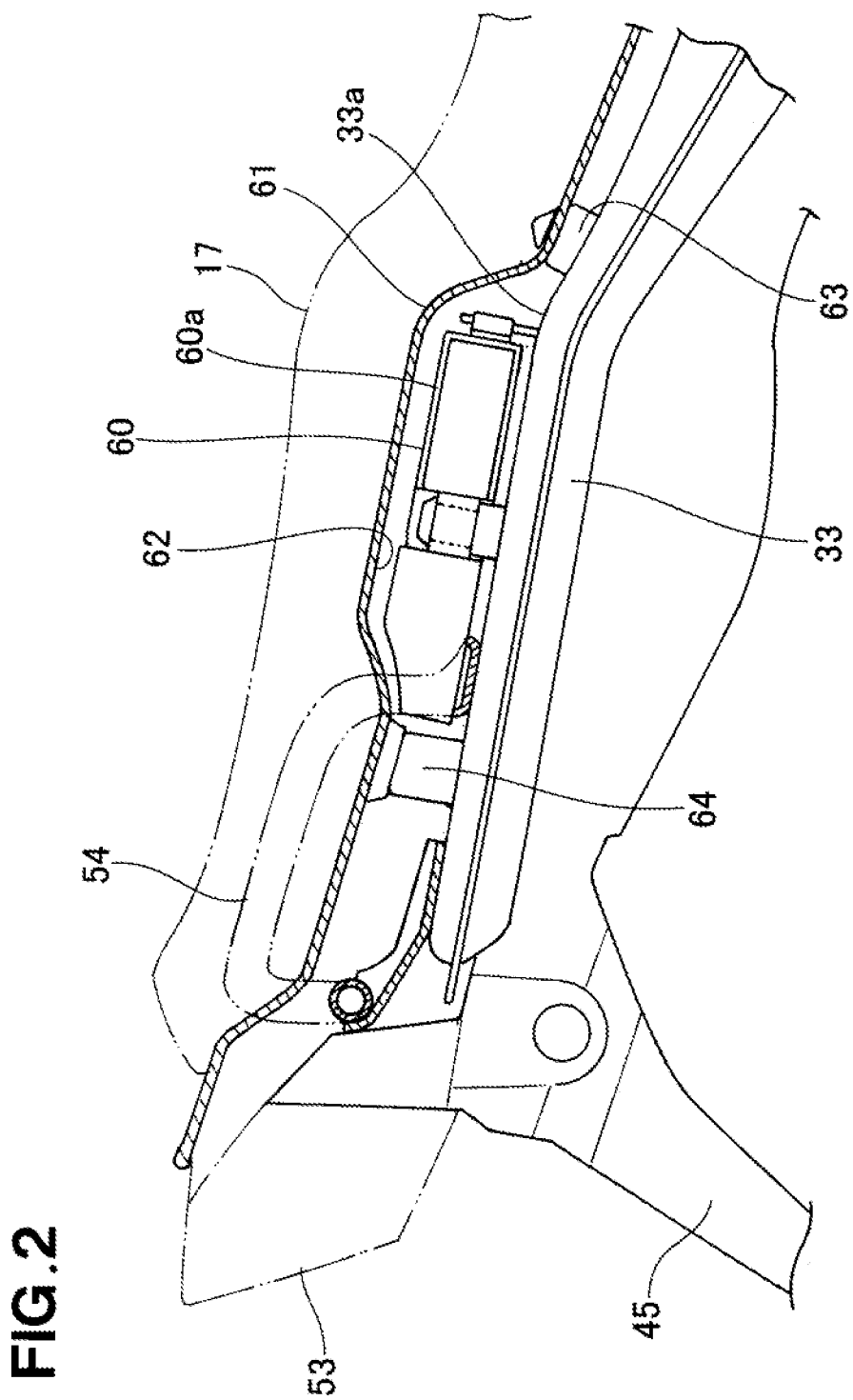
FIG. 2 is a side view of a relevant part to the present invention.

As shown in FIG. 2, the anti-theft device 60 is disposed on an upper surface of the seat rail 33. Above the anti-theft device 60 is disposed the seat 17. The anti-theft device 60 is received in a recess formed on a bottom plate 61 of the seat 17.

A cylindrical front bushing 63 extends downwardly from the bottom plate 61 and, is disposed forwardly of the anti-theft device 60. A cylindrical rear bushing 64 extends downwardly from the bottom plate 61 and is disposed rearwardly of the anti-theft device 60. The front and rear bushings 63, 64 and the recess 62 prevent abutment of the bottom plate 61 on the anti-theft device 60 when the seat 17 is carried on the seat rail 33.

The anti-theft device 60 is mounted with its upper surface 60a oriented generally horizontally. The seat 17 having the bottom plate 61 disposed above the anti-theft device 60 is made of non-metal material allowing electrical waves to be travel therethrough.

A grab rail 54 for an occupant to hold is attached to the seat rail 33 and located rearwardly of the anti-theft device 60.

The anti-theft device 60 is disposed in generally horizontal orientation and a region above the anti-theft device 60 allows electrical waves to travel through the region so as to improve transmission of electrical waves into and from the anti-theft device 60.

Next, discussion will be made below as to a structure supporting the anti-theft device.

Figure 3:
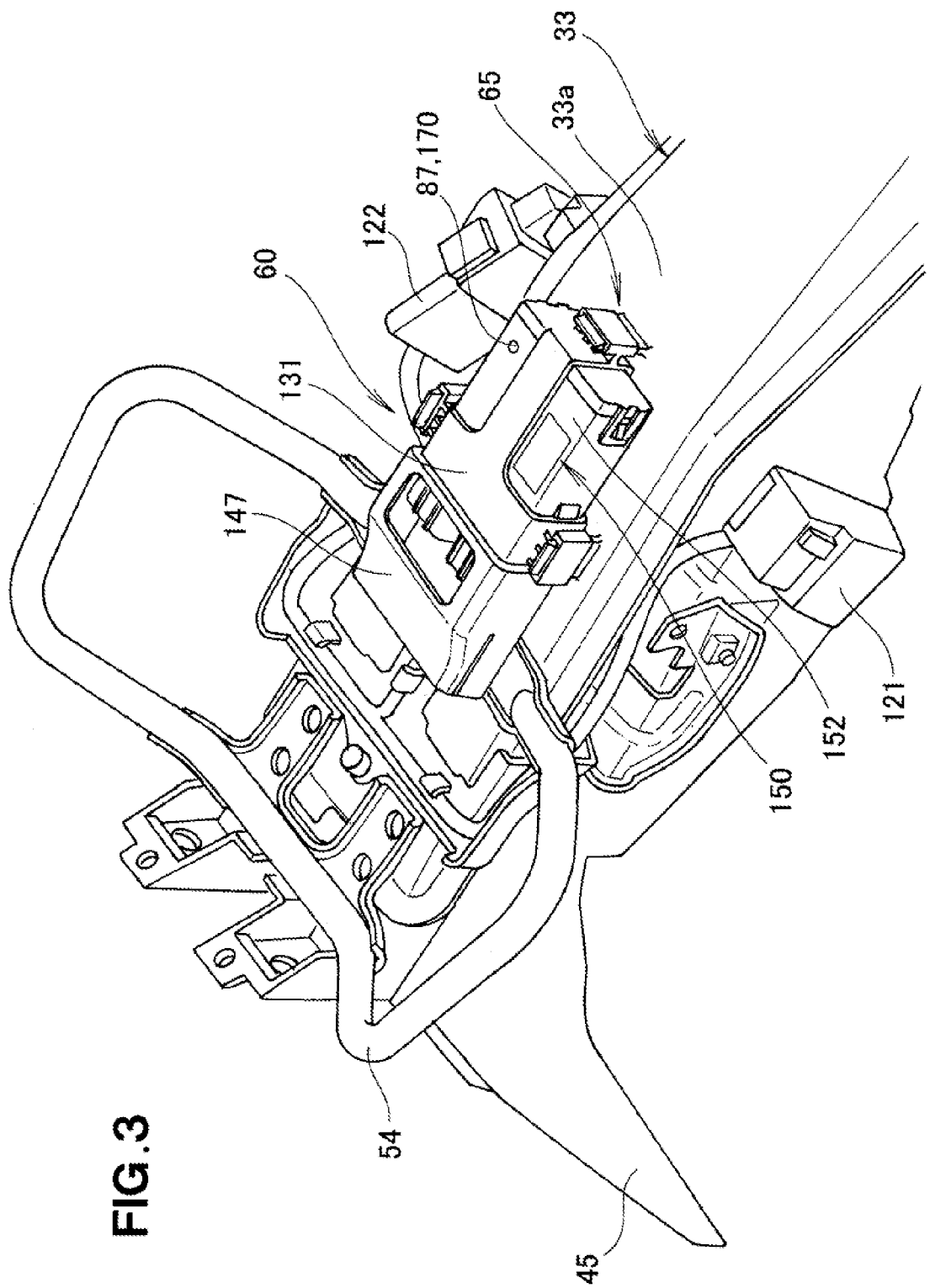
FIG. 3 is a perspective view of the anti-theft device and its surroundings.

As shown in FIG. 3, the anti-theft device 60 is attached to a lateral center of the upper surface 33a of the seat rail. More specifically, the anti-theft device 60 is supported by a support stay 65 welded to the upper surface 33a of the seat rail. The support stay 65 will be discussed in detail later.

Next, discussion will be made below as to the anti-theft device and the surroundings with reference to a block diagram shown in FIG. 4.

Figure 4:
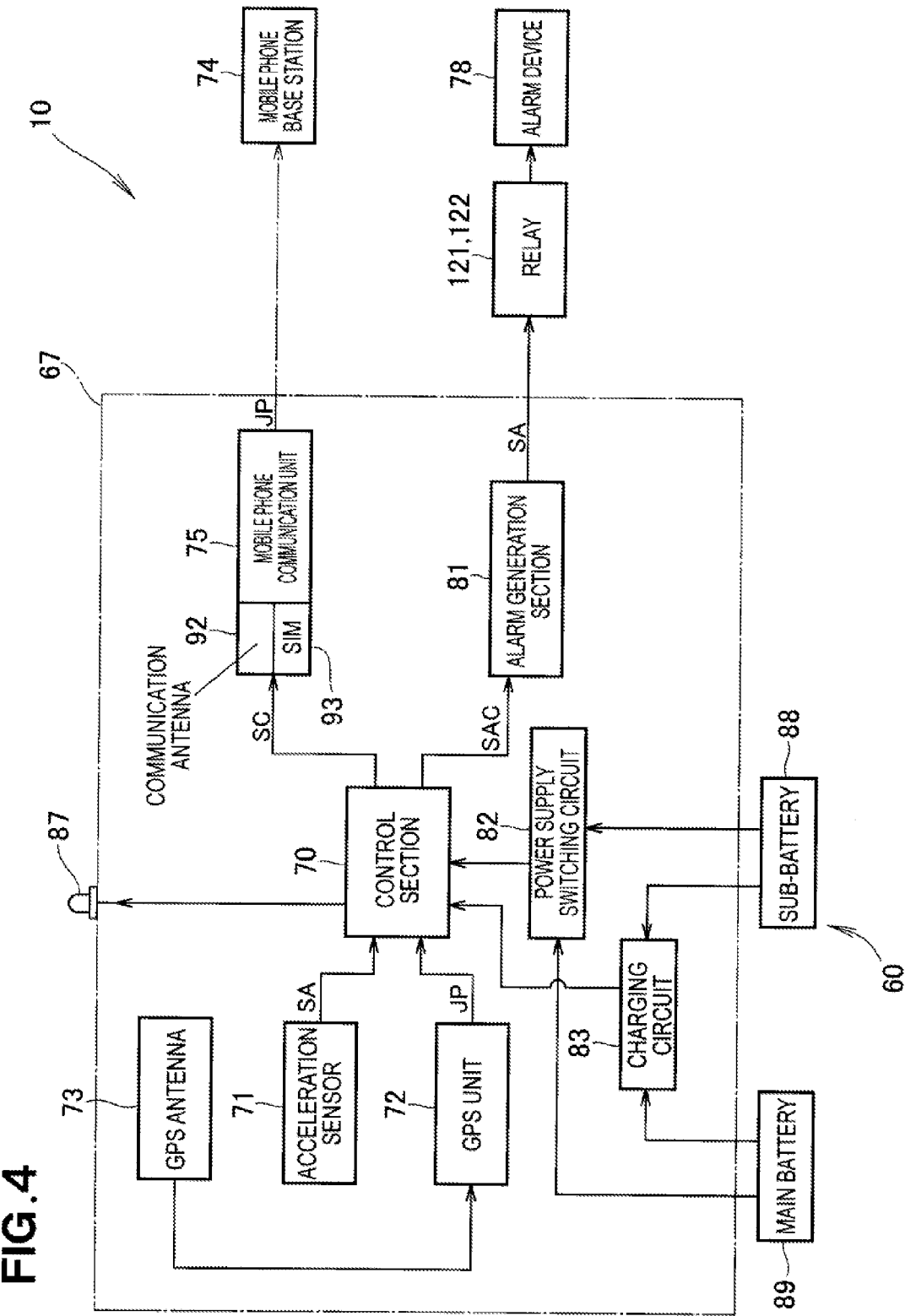
FIG. 4 is a block diagram of the anti-theft device and the surroundings.

As shown in FIG. 4, the anti-theft device 60 includes a circuit board 67 having many electronic components mounted thereon. The circuit board 67 includes an acceleration sensor 71 for detecting vibration on the body of a saddle-straddling type vehicle (the motorcycle 10). The circuit board 67 also includes a GPS (Global Positioning System) unit 72 for detecting a current position of the motorcycle by receiving orbital information from a plurality of artificial satellites, and a GPS antenna 73 mounted to the UPS unit 72 for receiving signals from the satellites. The circuit board 67 also includes a control section 70 for receiving an acceleration signal SA from the acceleration sensor 71 and position information JP from the GPS unit 72 to give instructions for taking measures against a thieve. The circuit board 67 further includes a mobile phone communication section 75 for transmitting the position information JP to a mobile phone base station 74 on the basis of a communication command SC from the control section 70. The circuit board 67 further includes an alarm generation section 81 for transmitting an alarm signal SA to alarm devices 78 (the horn 52 and lights 79 such as the headlight 48 and the blinkers 50, 51) on the basis of an alarm control signal SAC from the control section 70 for activating the alarm devices 78. In addition, the circuit board 67 includes a power supply switching circuit 82 for switching a power source feeding a power to the control section 70, as will be discussed later. The circuit board 67 also includes a charging circuit 83 providing a power to a sub-battery 88.

The anti-theft device 60 includes the circuit board 67 and the sub-battery 88. The sub-battery 88 is connected to the control section 70. The motorcycle includes a main battery 89 separate from the sub-battery 88.

When the anti-theft device 60 is in operation, a light emitting diode 87 is turned on. The light emitting diode 87 engages an upper surface 132a of a case of the anti-theft device such that the operation of the anti-theft device can be confirmed from outside the case.

The power supply switching circuit section 82 is connected to the main battery 89 and the sub-battery 88 for switching the power source to feed a power to the control section 70. The sub-battery 88 feeds a power to the circuit board 67 when the main battery 89 carried on the motorcycle is out of a power to be fed to the circuit board 67. The sub-battery 88 is, for example, a nickel-metal hydride or lithium battery.

The mobile phone communication unit 75 has a communication antenna 92 for transmitting a signal to the mobile phone base station 74, and a SIM (Subscriber Identity Module) tip 93 in which an ID number specifying a phone number is registered.

The circuit board 67 is connected to external elements which are, for example, the alarm devices 78 such as the blinkers 50, 51, the horn 52 and the stop lamp 53.

The sub battery 88 connected to the control section 70 is adapted to actuate the acceleration sensor 71 (FIG. 4) to cause the control section 70 to process an output signal from the acceleration sensor 71 even when the main battery 89 is removed from the motorcycle.

Next, discussion will be made below as to the anti-theft device and the surroundings with reference to a circuit diagram shown in FIG. 5.

Figure 5:
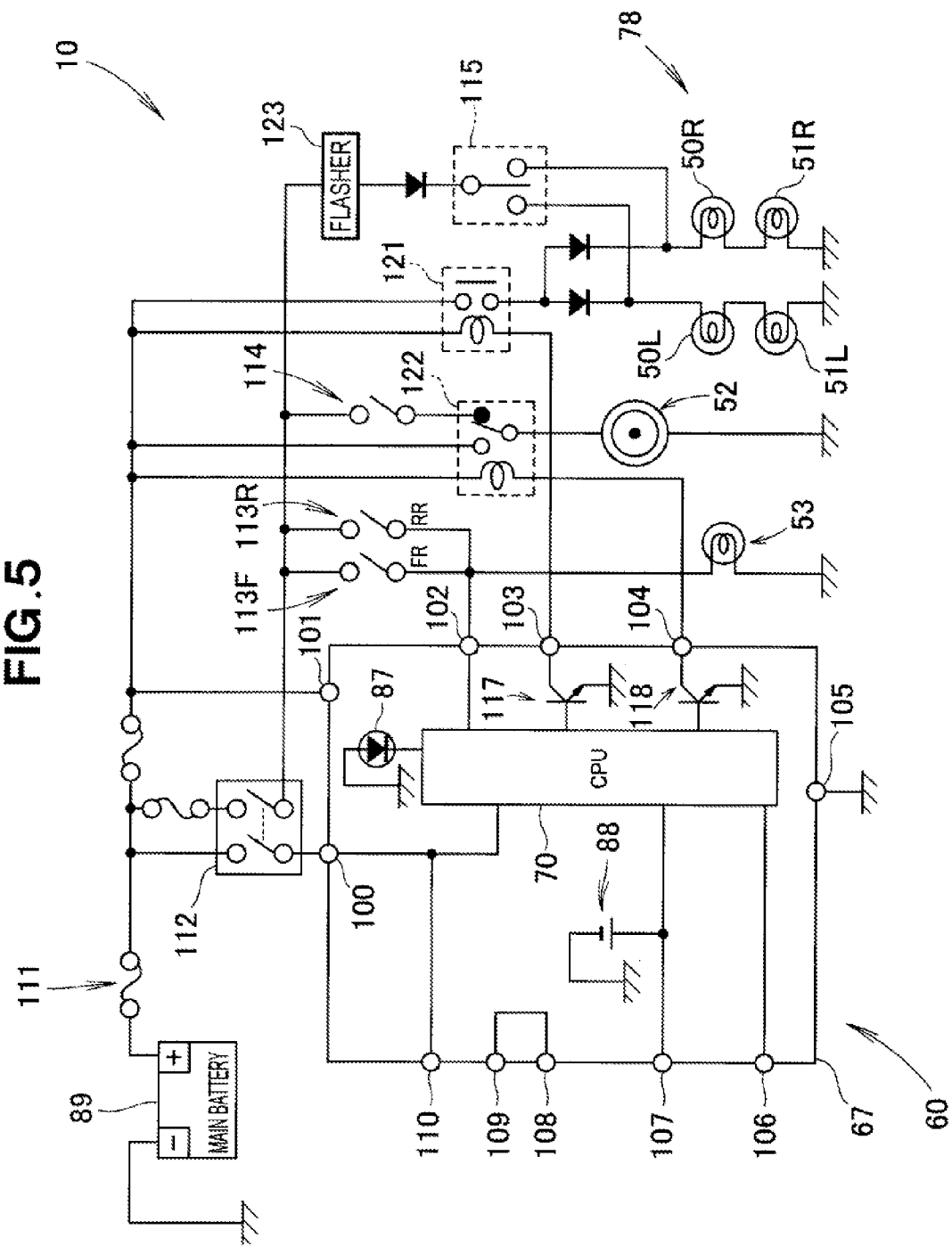
FIG. 5 is a circuit diagram of the anti-theft device and the surroundings.

As shown in FIG. 5, the circuit board 67 has a plurality of terminals 100 to 110. The terminal 100 is connected through a main fuse 111 to the main battery 89. The main battery 89 feeds a power to the terminal 100. The terminals 101, 102 are used to monitor operation of an ignition switch 112 to turn on or off a main power source of the motorcycle and operation of stop switches 113F, 113R to turn on the stop lamp 53.

The horn 52 is actuated by operation of a horn switch 114. The front blinkers 50 and the rear blinkers 51 flash by operation of a blinker switch 115 disposed on the handlebar 41. A flasher 123 is connected to the blinker switch 115 for flashing of the blinkers 50L, 50R, 51L, 51R.

When the horn switch 114 is turned on with the ignition switch 112 in an on state, the horn 52 honks. The front blinker 50L and the rear blinker 51L flash when the blinker switch 115 is turned leftward. The front blinker 50R and the rear blinker 51R flash when the blinker switch 115 is turned rightward. The stop switch 113F is switched on to turn the stop lamp 53 on when a front wheel brake is applied. The stop switch 113R is switched on to turn the stop lamp 53 on when a rear wheel brake is applied.

With the ignition switch 112 in an off state, the horn 52, the blinkers 50L, 50R, 51L, 51R and the stop lamp 53 are not operated even when the horn switch 114, the blinker switch 115 and the stop switches 113F, 113R are switched on.

When abnormality is detected as the motorcycle stops, the control section 70 switches transistors 117, 118 on to actuate relays 121, 122 via the terminals 103, 104 such that the horn 52, the blinkers 50L, 50R, 51L, 51R and the stop lamp 53 are operated as alarm means. That is, the anti-vehicle theft device 60 is carried on the motorcycle 10 and, when the motorcycle 10 is stolen, informs the surroundings to that effect.

The terminal 105 is the ground terminal, and the terminals 106 to 110 are ones used for inspection of the circuit board 67 etc. and their further descriptions are omitted.

Next, discussion will be made below as to the case incorporating the circuit board of the anti-theft device and the like.

Figure 6:
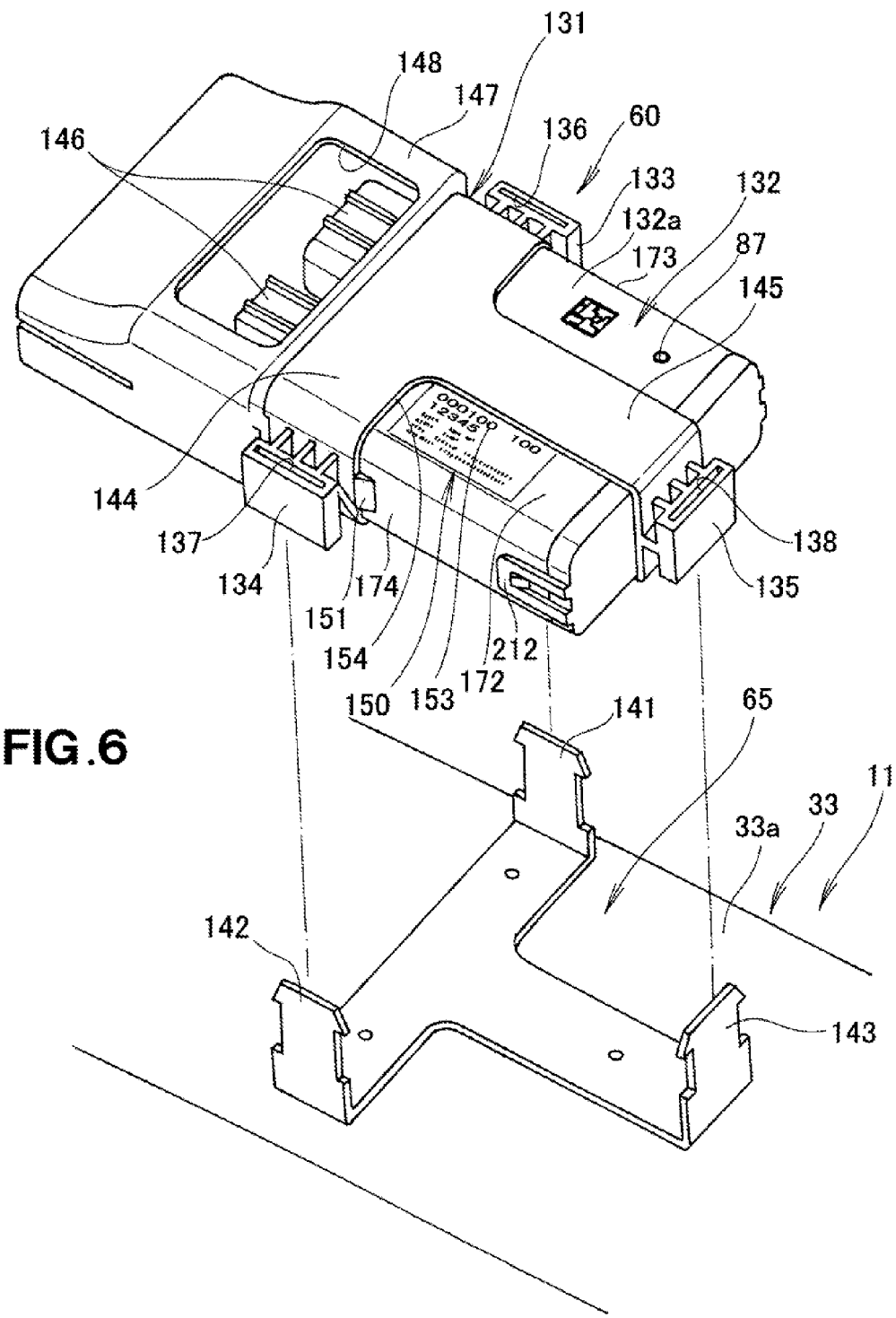
FIG. 6 is an exploded perspective view of a structure for mounting the anti-theft device.

As shown in FIG. 6, the anti-theft device 60 includes a box-shaped case body 132 closely surrounded by an elastic member 131 extending longitudinally and laterally of the case body 132. The elastic member 131 is attached to the support stay 65 welded to the upper surface 33a of the seat rail 33.

More specifically, the elastic member 131 has first to third protrusions 133 to 135 formed externally thereof. The first to third protrusions 133 to 135 have first to third vertically extending engagement holes 136 to 138, respectively.

The support stay 65 is T-shaped as viewed in plan, and has first to third projections 141 to 143 upwardly bent. These first to third projections 141 to 143 are engageable with the first to third engagement holes 136 to 138, respectively.

That is, the anti-theft device 60 is attached to the support stay 65 with the first to third projections 141 to 143 respectively inserted into the first to third engagement holes 136 to 138 of the elastic member 131 supporting and closely surrounding the case body 132.

Figure 7:
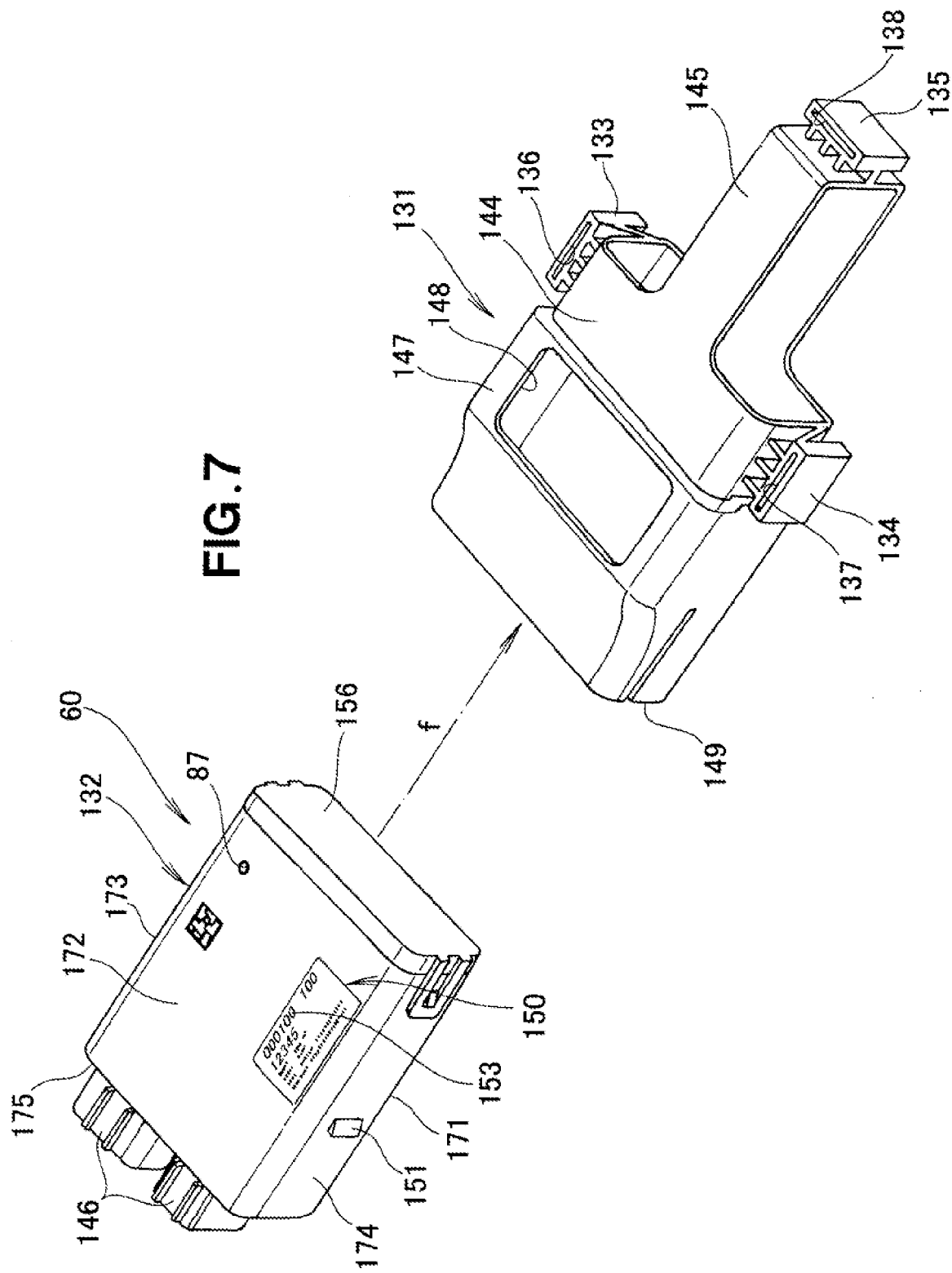
FIG. 7 is a perspective view of a case body and an elastic member to be attached to the case body.

As shown in FIG. 7, the case body 132 is adapted to be wrapped in the elastic member 131. The elastic member 131 includes a first support portion 144 taking the form of a strip extending laterally around the case body 132, and a second support portion 145 taking the form of a strip extending longitudinally around the case body 132. The first and second protrusions 133, 134 of the elastic member 131 are disposed on lateral left and right surfaces of the first support portion 144. The third protrusion 135 of the elastic member 131 is disposed on a longitudinal front surface of the second support portion 145. The elastic member 131 further includes a terminal guard portion 147 extending rearwardly from the first support portion 144 for closely surrounding a set of terminals 146. The terminal guard portion 147 has an opening 148 formed through a top thereof for allowing a portion of the set of terminals 146 to be viewed when the elastic member 131 is inserted into the case body 132. The terminal guard portion 147 has an entrance hole 149 formed at a rear side thereof to allow the anti-theft device 60 be inserted into and removed from the elastic member 131. The anti-theft device 60 can be inserted through the entrance hole 149 into the elastic member 131, as indicated by an arrow of FIG. 7.

Referring back to FIG. 6, outwardly protruding stopper prongs (only one shown) 151 are disposed on left and right sidewalls 173, 174 of the case body 132 to abut on the first support portion 144 surrounding a rear side of the anti-theft device 60, thereby preventing the anti-theft device 60 from coming out of the elastic member 131.

The case body 132 is supported by the motorcycle through the elastic member 131. Stuck to the upper surface 132a of the case body 132 is a seal 150 indicating an ID number 153 of the anti-theft device 60. The elastic member 131 has a cutout portion 154 formed along the strip-shaped first support portion 144 and the strip-shaped second support portion 145 perpendicular to the first support portion 144, such that the ID number 153 indicated on the seal 150 is viewable with the case body 132 wrapped in the elastic member 131.

Next, discussion will be made as to a structure of the anti-theft device 60.

Figure 8:
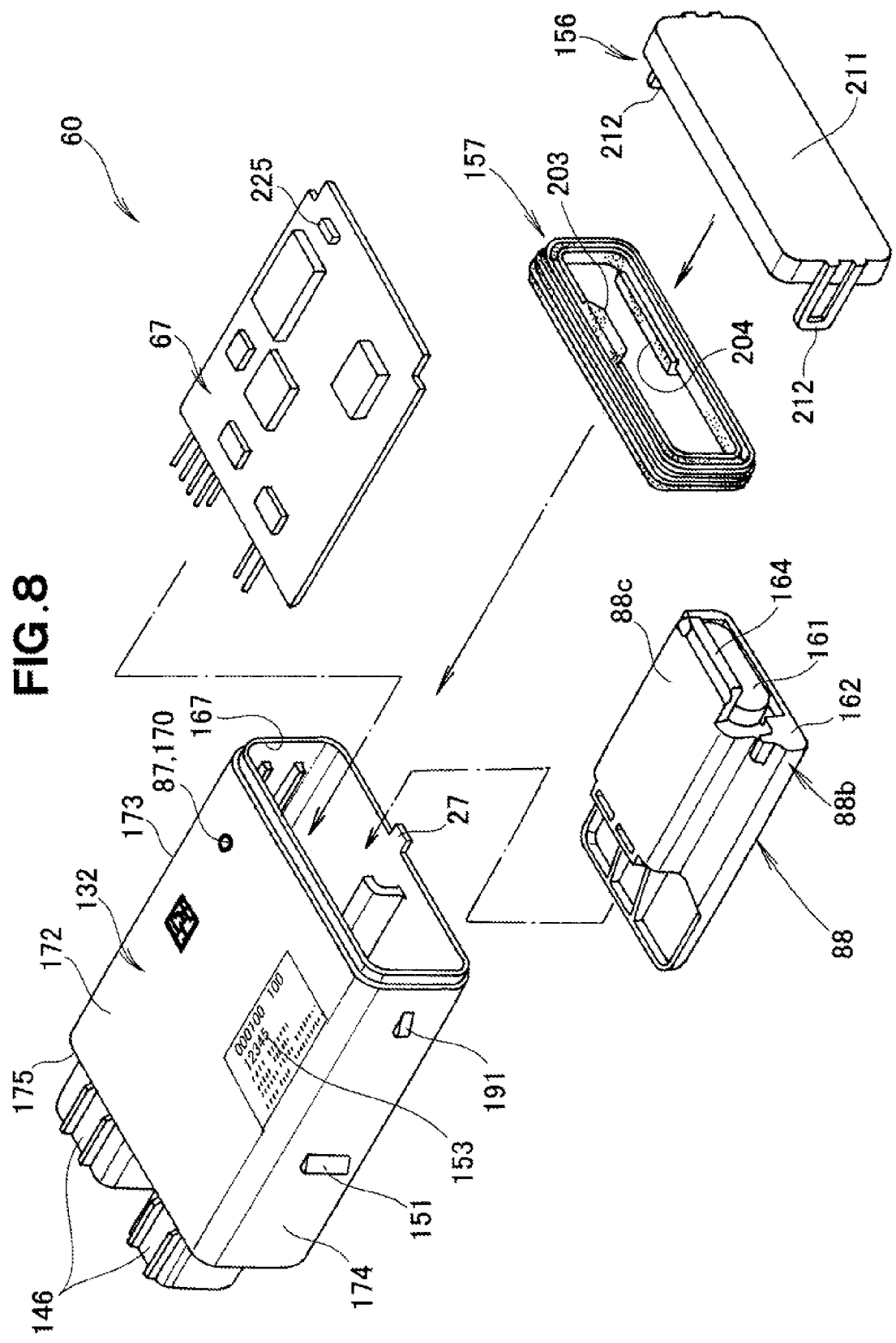
FIG. 8 is an exploded perspective view of the anti-theft device as disassembled into elements.

As shown in FIG. 8, the anti-theft device 60 includes the case body 132, the circuit board 67 built in the case body 132, and the sub-battery 88 located below the circuit board 67 and built in the case body 132. In addition, the anti-theft device 60 includes a lid member 156 for closing an opening 167 of the case body 132, and a seal member 157 disposed between the lid member 156 and the opening 167 for sealing a gap therebetween.

The anti-theft device 60 is carried on the motorcycle 10 (FIG. 1) for detecting motorcycle abnormality resulting from theft of the motorcycle 10 and indicating the theft to the surroundings of the motorcycle.

The circuit board 67 is removably inserted through the opening 167 in the case body 132. Similarly, the sub-battery 88 is removably inserted through the opening 167 in the case body 132. The seal member 157 and the lid member 156 are detachably disposed in the opening 167 of the case body. A coupler 225 is mounted on the circuit board 67 for separating the sub-battery 88 from the circuit board 67.

Next, discussion will be made with reference to FIG. 9 to FIG. 17 as to a structure allowing for detachable insertion of the circuit board and the sub-battery into the case body.

First, a structure of the sub-battery is discussed.

Figure 9:
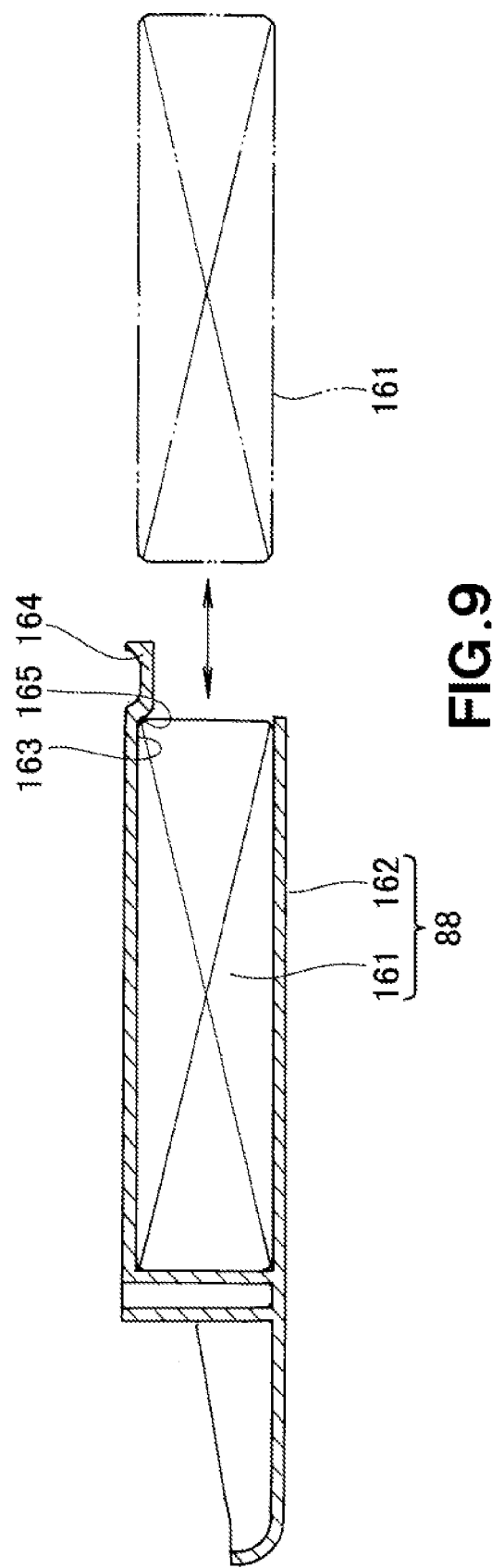
FIG. 9 is a view showing in cross-section an elastic cover and a sub-battery body.

As shown in FIG. 9, the sub-battery 88 includes a sub-battery body 161 and an elastic cover 162 wrapping the sub-battery body 161. The elastic cover 162 has a free portion 163 defining a port through which the sub-battery body 161 is put into or taken out of the elastic cover 162 when the sub-battery 162 is inserted into or removed from the elastic cover 162. The sub-battery 88 also includes a finger engaging portion 164 adapted to be engaged with an operator's finger or thumb when the operator pulls the sub-battery 88 out of the case body 132.

The free portion 163 tapers at a portion 165 thereof and the tapering portion 165 is contiguous with the finger engaging portion 164. The tapering portion 165 prevents the sub-battery body 161 received in the elastic member 131 from coming out of the elastic member 131.

Next, detailed discussion is made as to the case body.

Figure 10:
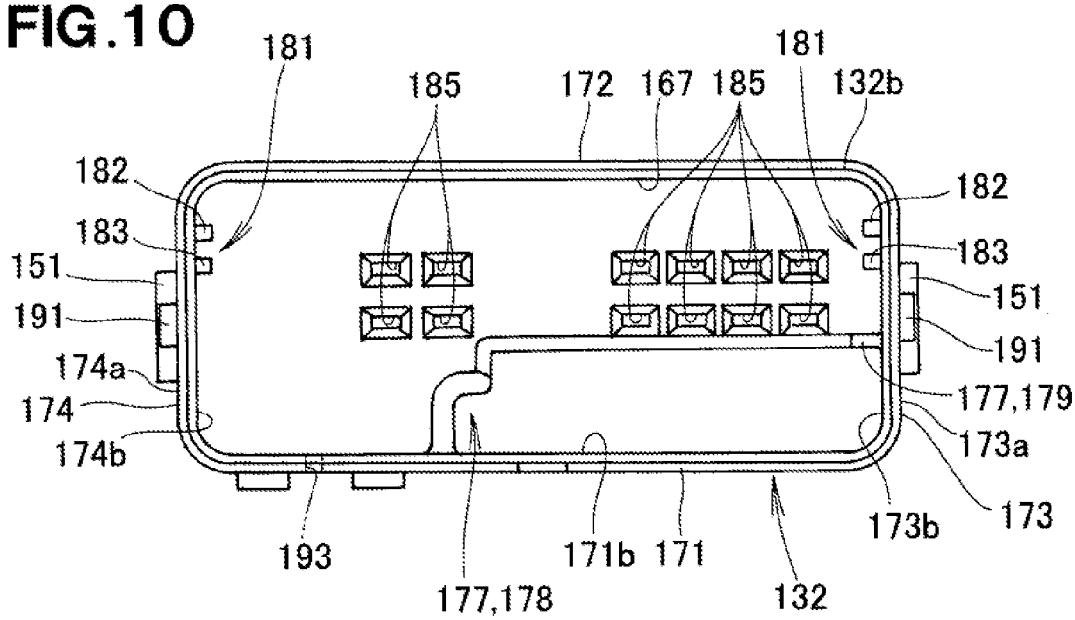
FIG. 10 is a front view of the case body.

Referring to FIG. 7 and FIG. 10, the case body 132 includes a bottom wall 171, a top wall 172, a rear wall 175, the left, sidewall 173 and the right sidewall 174. The walls 171, 172, 173, 174 and 175 define a box-shaped parallelepiped. The case body 132 has a front surface 132b defining the opening 167.

As shown in FIG. 10, the case body 132 has a sub-battery support portion 177 formed along a bottom wall inner surface 171b and a left sidewall inner surface 173b for supporting the sub-battery 88 (FIG. 8) to be inserted into or removed from the case body 132. The case body 132 also has left and right insertion channels 181, 181 formed on the inner surfaces 173b, 174b of the left and right sidewalls for slidably supporting the circuit board 67 (FIG. 8).

The insertion channels 181, 181 are each defined by upper and lower rails 182, 183 protruding from the inner surfaces 173b, 174b of the left and right sidewalls. The upper and lower rails 182, 183 extend in a direction perpendicular to the sheet of FIG. 10. The upper and lower rails 182, 183 guide the circuit board 87 (FIG. 8).

The sub-battery support portion 177 includes a left support 178 and a right support 179.

The left support 178 is generally L-shaped when viewed in front elevation, and includes a part extending upwardly from the bottom wall 171 and a horizontal part extending laterally leftward from the upward extending part. The left support 178 is adapted to engage a left end portion 88b of the sub-battery 88. The right support 179 protrudes horizontally from the inner surface 173b of the left sidewall for engagement with a right upper surface 88c of the sub-battery 88.

The rear wall 175 has a plurality of pin holes 185 extending therethrough. The rear wall 175 (FIG. 8) has an outer surface on which the set of terminals 146 having the pin holes 185 are disposed for connection to connectors.

Disposed forwardly of the stopper prongs 151, 151 are lid stoppers 191 protruding from outer surfaces 173a, 174a of the left and right sidewalls for engagement with the lid member 156 (FIG. 8).

Turning back to FIG. 7, the elastic member 131 includes the first support portion 144 surrounding the left sidewall 173, right sidewall 174, top wall 172 and bottom wall 171 of the case body 132. The elastic member 131 also includes the second support portion 145 extending forwardly from the first support portion 144. The second support portion 145 surrounds the top wall 172 of the case body 132, the lid member 156 covering the front surface 132b, and the bottom wall 171.

The first protrusion 133 having the first engagement hole 136 is disposed on the first support portion 144 at a location corresponding to the left sidewall 173. The second protrusion 134 having the second engagement hole 132 is disposed on the first support portion 144 at a location corresponding to the right sidewall 174. The third protrusion 135 having the third engagement hole 138 is disposed on the second support portion 145 at a location corresponding to the lid member 156.

Since the case body 132 is surrounded by the elastic member 131 having these first, second and third engagement holes 136, 137, 138, vibration of the motorcycle is absorbed by the elastic member 131, such that the vibration of the motorcycle can be less transmitted to the anti-theft device 60.

Next, discussion is made as to a waterproof breathable membrane.

Figure 11:
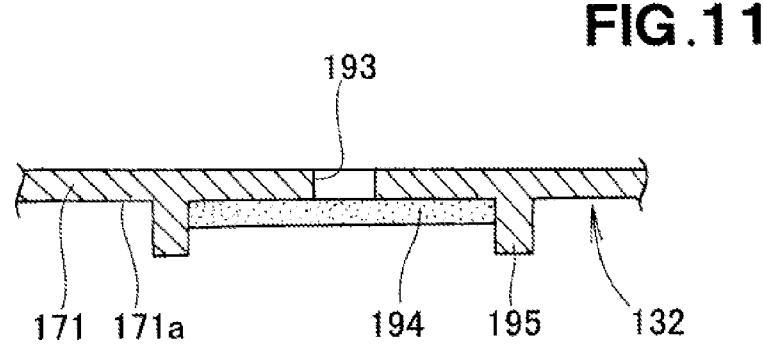
FIG. 11 is a cross-sectional view of a structure of the case body having a hole closed by a waterproof breathable membrane.

As shown in FIG. 11, the case body 132 has a hole 193 formed through the bottom wall 171. The case body 132 also includes a partition wall 195 protruding downwardly from a lower surface (an outer surface 171a) of the bottom wall 171 and extending around the hole 193 in a line conforming to a shape of a waterproof breathable membrane 194 such as GORE-TEX®. The waterproof breathable membrane 194 fits in a space defined by the partition wall 195 and covers and closes the hole 193 of the bottom wall 171.

Next, discussion is made as to a relationship between the insertion channel and the circuit board to be inserted into and removed from the insertion channel.

Figure 12:
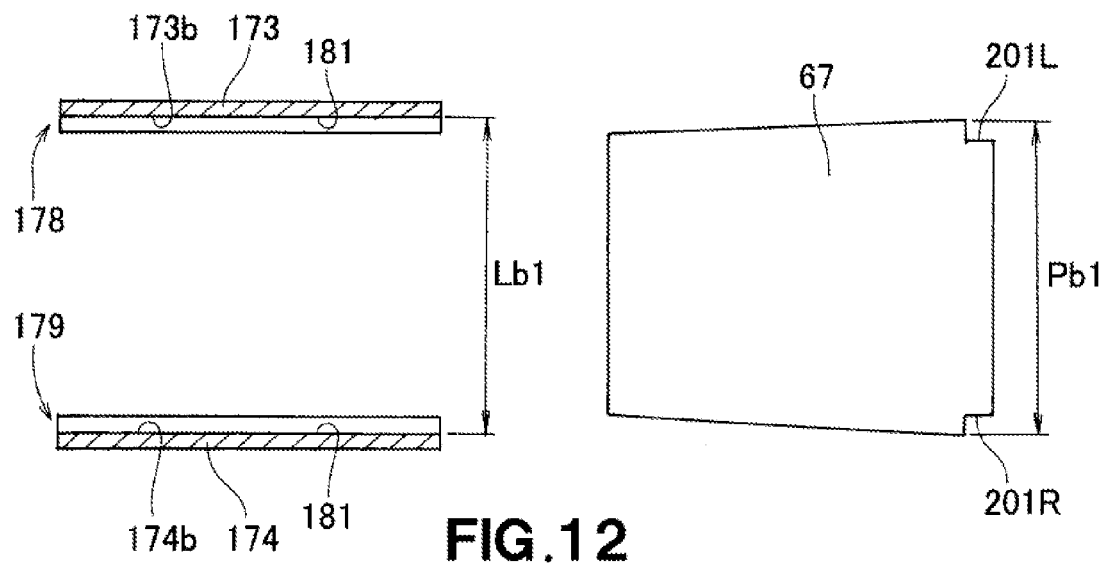
FIG. 12 is a view illustrating a dimensional relationship between the circuit board and left and right circuit board supports.
Figure 13:
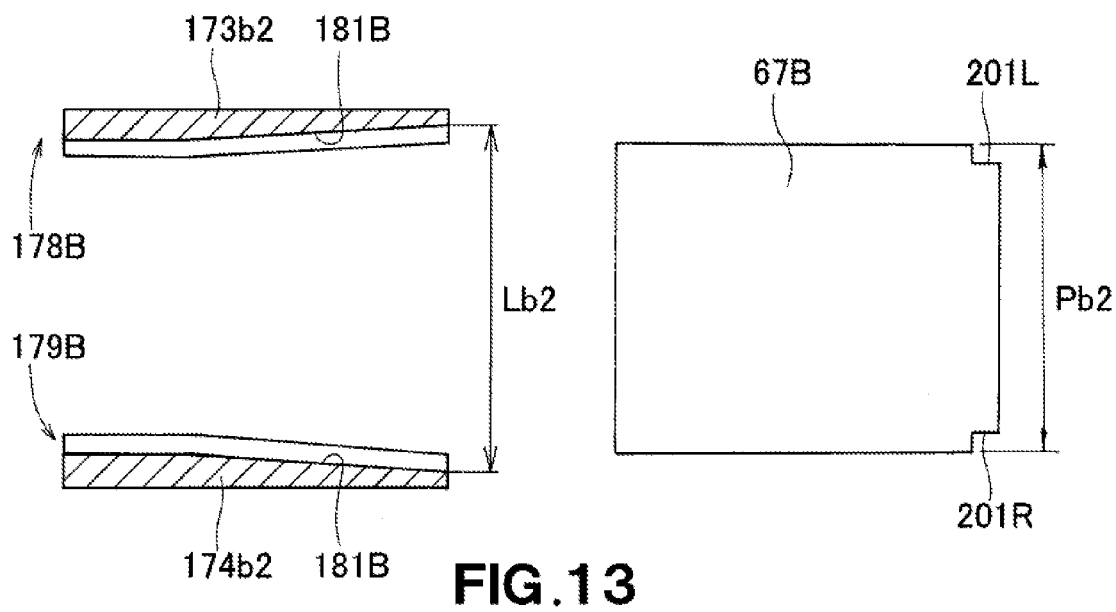
FIG. 13 is a view of modification to the circuit board and circuit board supports shown in FIG. 12.

It is noted that configurations of the insertion channels are exaggeratedly shown in FIGS. 12 and 13 for easy understanding.

As shown in FIG. 12, the insertion channels 181, 181 formed on the inner surfaces 173b, 174b of the left and right sidewalls are spaced from each other by a constant width or interval Lb1, and the circuit board 67 to be slid along the channels 181, 181 has a maximum width Pb1 extending laterally of the motorcycle.

It is noted that a direction of insertion or detachment of the circuit board 67 is defined as a longitudinal direction of the circuit board 67, and a direction perpendicular to the longitudinal direction is defined as a lateral direction of the circuit board 67. The circuit board to be received in the case body 132 gradually widens toward left and right cutouts 201L, 201R of the circuit board. The circuit board has the width Pb1 in a vicinity of the left and right cutouts 210L, 201R.

The width of the circuit board 67 gradually increases to have the maximum width Pb1 near the outlet of the case body. The circuit board 67 has lateral opposite edges formed to slide along the insertion channels without portions of the opposite edges abutting on the inner surfaces of the left and right sidewalls so as to facilitate insertion or detachment of the circuit board. With the circuit board 67 inserted in the case body 132, the circuit board 67 is supported at its portions of maximum width Pb1 by the insertion channels 181, 181 so as to ensure that the case body 132 supports the circuit board 67.

Next, discussion is made as to modification to a structure shown in FIG. 12.

As shown in FIG. 13, the circuit board 67B to be received in the case body 132 has a constant width Pb2. Insertion channels 181B, 181B are spaced from each other by a width or interval increasing toward the opening 167 (FIG. 8). The modified structure shown in FIG. 13 has the same functions and advantages as those discussed in relation to FIG. 12, and hence their description is omitted.

Next, discussion is made as to the circuit board and a sub-battery stopping structure.

Figure 14:
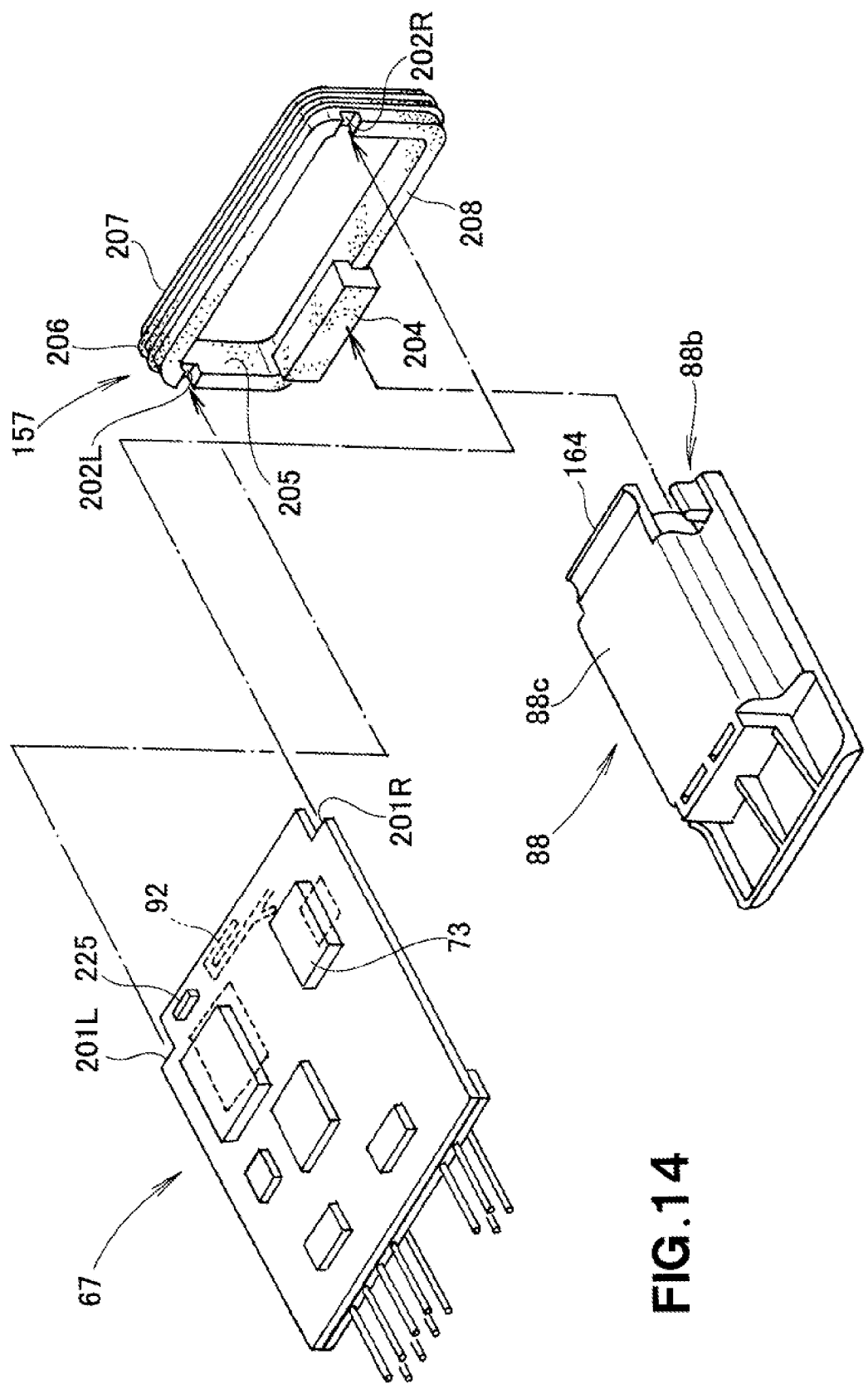
FIG. 14 is an exploded perspective view showing that a seal member is to stop the circuit board and the sub-battery.

As shown in FIG. 14, the circuit board 67 has the left and right cutouts 201L, 201R formed at its left and right ends for abutment on the seal member 157. The seal member 157 has left and right recesses 202L, 202R to stop the left and right cutouts 201L, 201R. The seal member 157 has a circuit board stopper portion 203 (FIG. 8) to stop the circuit hoard 67 to thereby ensure that the circuit board 67 is fixed in the case body 132 (FIG. 8). The seal member 157 also has a sub-battery stopper portion 204 to stop the sub-battery 88.

Next, discussion is made as to a structure of the lid member.

Figure 15:
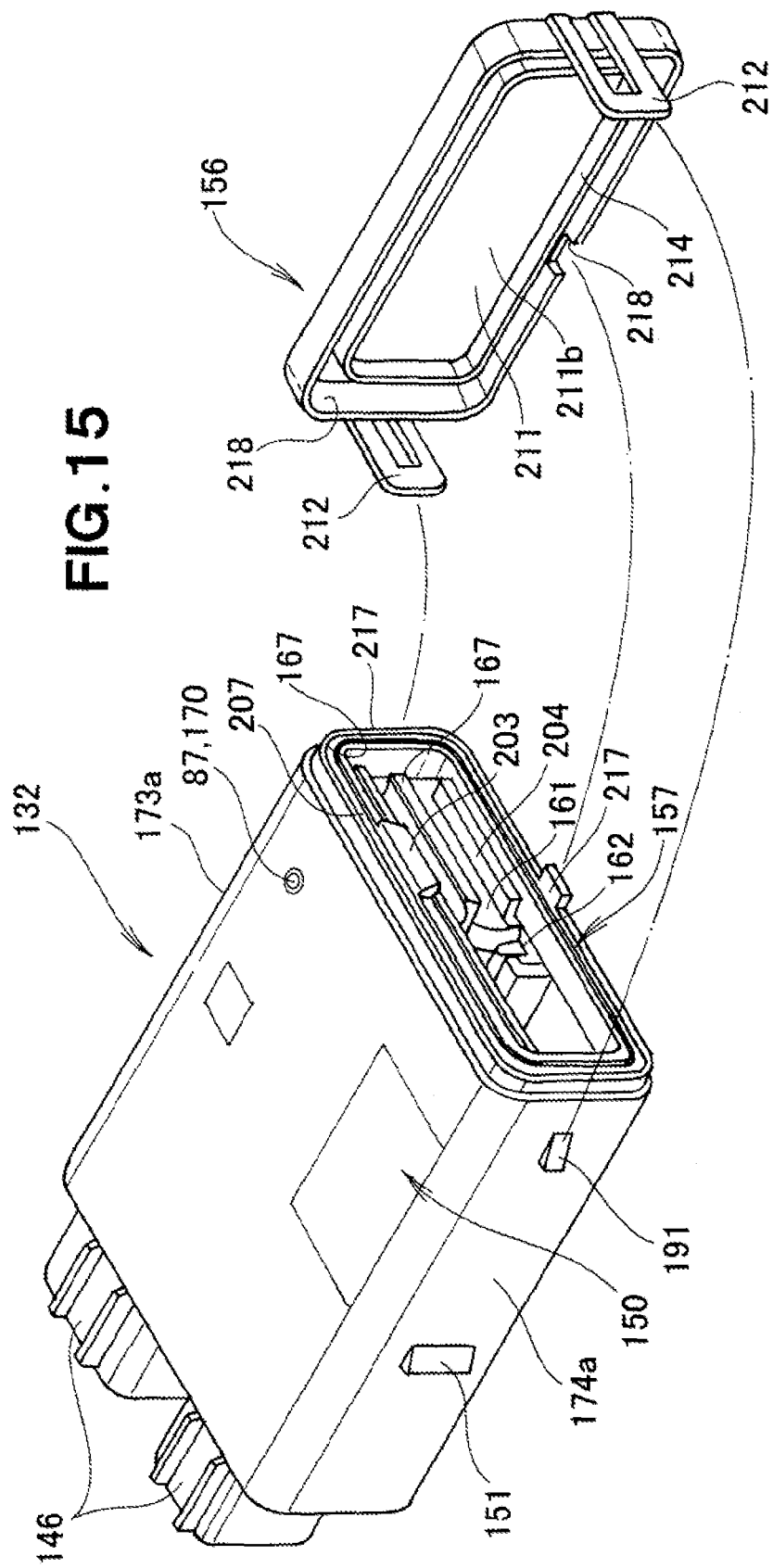
FIG. 15 is an exploded perspective view showing that a lid member is to close an opening of the case body.

As shown in FIG. 15, the lid stoppers 191 (only one shown) protrude from the outer surfaces 173a, 174a of the left and right sidewalls of the case body 132. The lid member 156 is a member for closing the opening 167 of the case body. The lid member 156 includes a body 211, retainer portions 212, 212 extending from left and right end portions of the body 211 toward the case body for engagement with the lid stoppers 191, 191, and a circumferential wall 214 projecting from an interior surface 211b of the body 211 toward inside the case body. The lid member 156 is detachably attached to the case body 132 with the fastener portions 212, 212 engaging the lid stoppers 191, 191.

Next, discussion will be made as the seal member.

Figure 16:
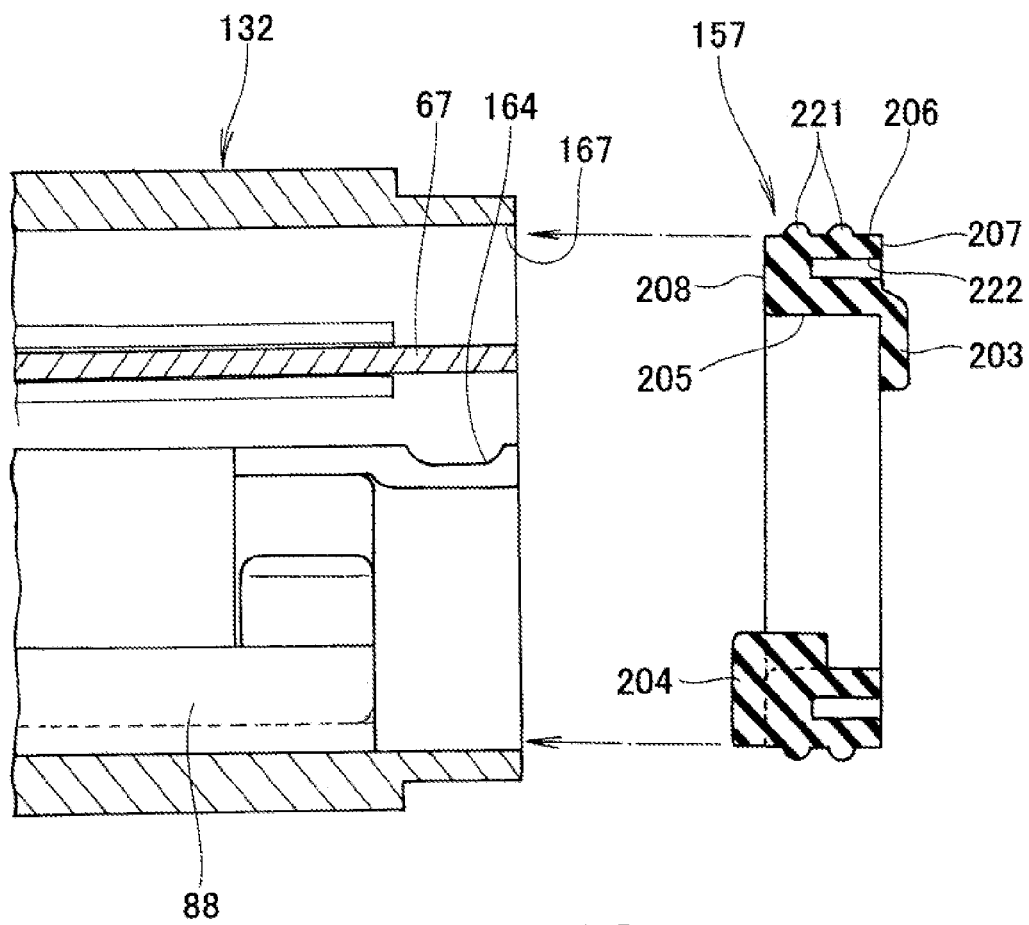
FIG. 16 is a view showing that the seal member is to fit in an inlet of the case body.

As shown in FIG. 16, the seal member 157 is a rectangular frame-shaped member having an opening 205. The seal member 157 includes an outer circumferential seal surface 206 fitting in the opening 167 of the case body for preventing ingress of foreign matters into the case body 132. The seal member 157 has an outside surface 207 located outside the outer circumferential seal surface 206 and opposite the case body. The outside surface 207 is to be pressed by the lid member 156. The circuit board stopper portion 203 of the seal member 157 is disposed adjacent the opening 205 and protrudes in a direction along the outside surface 207. The circuit board stopper portion 203 is to stop the circuit board 67. The seal member 157 has an inside surface 208 located opposite the outside surface 207. The sub-battery stopper portion 204 of the seal member 157 extends along the inside surface 208 and protrudes into the opening 205. The sub-battery stopper portion 204 is to stop the sub-battery 88.

Formed on the outer circumferential seal surface 206 are two lines of convex beads 221 protruding outwardly to efficiently seal the opening 205.

Next, discussion is made as to the case body with the seal member fitting therein and the lid member attached thereto.

Figure 17:
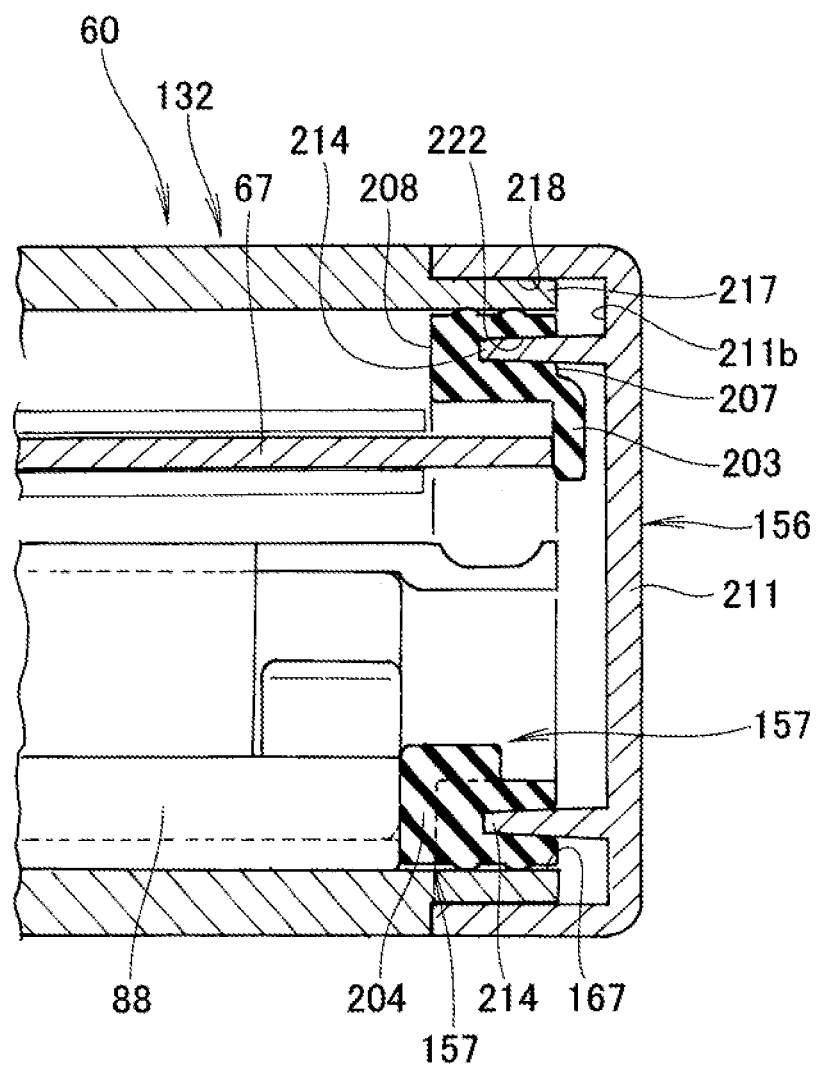
FIG. 17 is a cross-sectional view of a structure including the circuit board, the sub-battery, the case body receiving the circuit board and the sub-battery, and the lid member closing an opening of the case body.

As shown in FIG. 17, the seal member 157 has a groove 222 into which the circumferential wall 214 is inserted. The seal member 157 fits in the opening 167 of the case body. The seal member 157 includes the circuit board stopper portion 203 for preventing the circuit board 67 from coming out of the case body, and the sub-battery stopper portion 204 for preventing the sub-battery 88 from coming out of the case body.

The circumferential will 214 extends into the case body and is inserted into the groove 222 formed on the outside surface 207 of the seal member 157.

The case body 132 has a fitting projection 217, and the lid member 156 has a fitting recess 218 formed on the interior surface 211b such that the fitting projection 217 fits in the fitting recess 218.

Next, discussion is made as to advantages of the anti-theft device discussed above.

Turning back to FIG. 8, the circuit board 67 having the electronic components mounted thereon is removably inserted through the opening 167 into the case body 132. Similarly, the sub-battery 88 is removably inserted through the opening 167 into the case body 132.

Attachment of the sub-battery 88 to the case body 132 or detachment of the same therefrom requires just insertion or removal of the sub-battery 88 though the opening 167. Attachment of the circuit board 67 to the case body 132 or detachment of the same therefrom requires just insertion or removal of the circuit board 67 through the opening 167. Since the sub-battery 88 and the circuit board 67 can be easily attached to or detached from the case body 132, replacement of the sub-battery 88 can be done easily.

Turning back to FIG. 17, the seal member 157 fits in the opening 167 of the case body and the lid member 167 closes the opening 167 with the circumferential wall 214 extending into the case body and inserted into the groove 222 of the seal member 157. The seal member 157 interposed between the case body 132 and the lid member 156 provides a better sealability.

The present invention provides the anti-theft device 60 allowing for easy replacement of the sub-battery 88 and having a better sealability.

The seal member 157 includes the circuit, board stopper portion 203 to prevent the circuit board 67 from coming out of the case body, and the sub-battery stopper portion 204 to prevent the sub-battery 88 from coming out of the case body.

The circuit board stopper portion 203 keeps the circuit board 67 inserted into the case body 132 and the sub-battery stopper portion 204 keeps the sub-battery 88 inserted into the case body 132, thereby ensuring that the circuit board 67 and the sub-battery 88 are fixed within the case body 132.

Turning back to FIG. 14, the circuit board 67 to abut on the seal member 157 has the left and right cutouts 201L, 201R at the left and right ends thereof, and the seal member 157 has the left and right recesses 202L, 202R to stop the left and right cutouts 201L, 201R.

The circuit board 67 is held stationary by the left and right recesses 202L, 202R in addition to by the circuit board stopper portion 203 (FIG. 17), so as to ensure that the circuit board 67 is fixed within the case body 132.

Turning back to FIG. 15, the case body 132 has the fitting projection 217, and the lid member 156 has the fitting recess 218 in which the fitting projection 217 fits. The fitting projection 217 and the fitting recess 218 are formed on the case body 132 and the lid member 156, respectively, such that the lid member 156 can be oriented in a predetermined correct direction to be attached to the case body 132.

The sub-battery 88 is wrapped in the elastic cover 162, and the elastic cover 162 has the finger engaging portion 164. It is possible for an operator to easily remove the sub-battery 88 from the sub-battery support portion 177 of the case body 132 by pulling the sub-battery 88 with his finger engaged with the finger engaging portion 164 of the elastic cover 162 after the seal member 157 is detached from the case body 132. This means that the workability regarding the insertion or removal of the sub-battery 88 can be improved.

Turning back to FIG. 6, the case body 132 is elastically supported and wrapped in the elastic member 131. The seal 150 indicating the ID number 153 is stuck to the top wall 172. The cutout 154 is formed on the elastic member 131 to allow the ID number to be viewable.

The elastic member 131 wraps the case body 132 to protect the case body 132 such that the case body 132 can enjoy anti-vibration effect from the elastic member 131 and be more reliably secured to the vehicle body frame 11, as compared to the case body 132 merely supported on an elastic member. Since the elastic member 131 has the cutout portion 154 formed thereon to allow the ID number 153 to be viewable, it is not necessary to remove the elastic cover 131 in viewing the ID number 153 even when the anti-theft device 60 is wrapped in the elastic member 131. The ID number 153 is easy to view due to the cutout portion 154.

Referring to FIG. 10 and FIG. 11, the hole 193 of the case body 132 is closed by the waterproof breathable membrane 194. The waterproof breathable membrane 194 allows mists of water to pass therethrough but does not allow drops of water to pass therethrough.

The case body 132 has an inside space communicating with the outside through the waterproof breathable membrane 194, thereby facilitating release of damp residues in the inside space into the outside.

Turning back to FIG. 12, the width of the circuit board 67 gradually increases toward the left and right cutouts 201L, 201R. As the circuit board 67 slides along the left and right circuit board supports 178, 179 during insertion of the circuit board 67 into the case body 132, left and right end surfaces of the circuit board come close to the left and right circuit board supports 178, 179. When the insertion of the circuit board 67 into the case body is completed, the left and right end surfaces at the increased width of the circuit board 67 abut on the left and right circuit board supports 178, 179.

The circuit board 67 can be easily received in the case body 132 without requiring a large force because a gap is formed between each of the left and right end surfaces of the circuit board 67 and each of the left and right, circuit board supports 178, 179 as the circuit board 67 is inserted into the case body 132. When the insertion of the circuit board 67 into the case body 132 is completed, the left and right end surfaces of the circuit board abut on the left and right circuit board supports 178, 179 to ensure that the circuit board 67 can be supported in place.

Turning back to FIG. 8, the circuit board 67 is disposed above the sub-battery 88. Since the heavy sub-battery 88 is disposed low and the circuit board 67 smaller in weight than the sub-battery 88 is disposed above the sub-battery 88, a center of gravity of the anti-theft device 60 can be located so low that the anti-theft device 60 is difficult to shift and hence is stably positioned.

Turning back to FIG. 18, the coupler 225 is disposed on the circuit board 67 for separation of the sub-battery 88 from the circuit board 67. The sub-battery 88 is releasable from the circuit board 67, such that the sub-battery 88 alone can be removed from the case body 132 with the lid member 156 removed without taking the circuit board 67 out of the case body 132.

Turning back to FIG. 3, an operation indicating member 170 indicating operation of the circuit board 67 to outside the case body 132 and an indicating area 152 where the seal 150 indicating the ID number 153 is stuck are provided on an upper surface of the case body 132.

Operation of the anti-theft device 60 can be confirmed just by removal of the seat 17 (FIG. 1).

Tuning back to FIG. 11, the partition wall 195 is disposed on the case body 132 around the hole 193. Moisture on the bottom wall 171 of the case body 132 tends to be forced into the hole 193 due to a pressure difference caused when a pressure in the inside space of the case body 132 becomes lower than the atmospheric pressure.

In this regard, the present invention provides the partition wall 195 disposed around the hole 193, such that moisture on the bottom wall of the case body 132 is directed downwardly by the partition wall 195 without entering the inside space of the case body through the hole 193.

The anti-theft device 60 is offset laterally inwardly from each of lateral Opposite outer ends of the grab rail 54, such that the anti-theft device 60 is protected by the grab rail 54 extending laterally outwardly of the motorcycle. The grab rail 54 projects laterally outwardly from the seat 17 (FIG. 1) extending over the anti-theft device 60, thereby making anti-theft device 60 difficult for a third party's hand to access.

Although the present invention has been described as being applied to the motorcycle, the present invention is applicable to a saddled three-wheeled vehicle (a three-wheeled buggy) or saddled four-wheeled vehicle (a four-wheeled buggy) as well as an ordinal small-sized vehicle.

In FIG. 4, an engine control section may be provide to stop operation of the engine, that is, stop operation of an engine ignition system by transmitting an ignition stop signal to the system on the basis of an engine control signal from the control section.

INDUSTRIAL APPLICABILITY

The present invention is suitable for use as an anti-motorcycle-theft device.

REFERENCE SIGNS LIST

10 ... a vehicle (a motorcycle), 13 ... a front wheel, 14 ... a rear wheel, 17 ... a seat, 54 ... a grab rail, 60 ... an anti-vehicle-theft device, 67 ... a circuit board, 88 ... a sub-battery, 89 ... a main battery, 132 ... a case body, 152 ... an indicating area, 154 ... a cutout portion, 156 ... a lid member, 157 ... a seal member, 167 ... an opening of the case body, 170 ... an operation indicating member, 194 ... a waterproof breathable membrane, 195 ... a partition wall, 201L, ... a left cutout, 201R ... a right cutout, 202L ... a left recess, 202R ... a right recess, 203 ... a circuit board stopper portion, 204 ... a sub-battery stopper portion, 214 ... a circumferential wall, 217 ... a fitting projection, 218 ... a fitting recess, 222 ... a groove, 225 ... a coupler

The invention claimed is:

1. An anti-vehicle-theft device (60) carried on a vehicle (10) for preventing theft of the vehicle, the device comprising:
   a box-shaped case body (132) having one open side;
   a lid member (156) detachably attached to the case body and closing an opening (167) of the case body, the lid member having a circumferential wall (214) projecting into the case body;
   a circuit board (67) removably inserted through the opening of the case body into the case body and having electronic components mounted thereon;
   a sub-battery (88) removably inserted through the opening of the case body into the case body for feeding an electric power to the circuit board when a main battery (89) carried on the vehicle for feeding an electric power to the circuit board runs out;
   a seal member (157) fitting in the opening of the case body, the seal member having a groove (222) into which the circumferential wall of the lid member is inserted, the seal member including a circuit board stopper portion (203) for preventing the circuit board from coming out of the case body, and a sub-battery stopper portion (204) for preventing the sub-battery from coming out of the case body.

2. The device of claim 1, wherein the circuit board includes left and right cutouts (201L, 201R) at left and right, ends thereof, respectively, and the seal member includes left and right recesses (202L, 202R) holding the left and right cutouts of the circuit board stationary.

3. The device of claim 2, wherein one of the case body and the lid member includes a fitting projection (217), and a remaining one includes a fitting recess (218) in which the fitting projection fits.

4. The device of claim 3, wherein the sub-battery has an elastic cover (162), the sub-battery being wrapped in the elastic cover, the case body has a side from which the sub-battery is inserted into the case body, the elastic cover having a free portion (163) formed on the same side as the side of the case body for allowing the sub-battery to be inserted into and removed from the elastic cover, the elastic cover having a finger engaging portion (164) for engagement with an operator's finger when the operator pulls the sub-battery out of the elastic cover.

5. The device of claim 4, wherein the case body is supported by the vehicle through an elastic member (131), the case body has an upper surface (132a) indicating an ID number (153) of the anti-theft device, and the elastic member has a cutout portion (154) formed to allow the ID number to be viewable when the case body is wrapped in the elastic member.

6. The device of claim 1, wherein the case body has a hole (193) closed by a waterproof breathable membrane (194).

7. The device of claim 2, wherein the circuit board has a width extending in a direction perpendicular to a direction in which the circuit board is inserted into and removed from the case body, and the width gradually increasing toward the left and right, cutouts of the circuit board.

8. The device of claim 1, wherein the circuit board is disposed above the sub-battery.

9. The device of claim 1, wherein the circuit board has a coupler (225) mounted thereon for separating the sub-battery from the circuit board.

10. The device of claim 1, wherein the case body has an upper surface (132a) including an indicating area (152) indicating an ID number (153), the case body having an operation indicating member (170) provided on the upper surface thereof for indicating operation of the circuit board to outside the case body.

11. The device of claim 6, wherein the case body has a bottom wall (171) including a partition wall (195) around the hole, the partition wall surrounding the waterproof breathable membrane.

12. The device of claim 1, wherein the vehicle includes a seat (17) for an occupant and a grab rail (54) extending laterally leftward and rightward from the seat, and the anti-theft device is offset laterally inwardly from each of lateral outer ends of the grab rail.

* * * * *